Oct. 20, 1953  A. L. HINDALL ET AL  2,656,399
METHOD AND APPARATUS FOR CURING
POSITIVE STORAGE BATTERY PLATES
Filed June 28, 1951  2 Sheets-Sheet 1

INVENTORS
ALVA L. HINDALL
WILLIAM D. CARSON
BY
THEIR ATTORNEYS

Oct. 20, 1953

A. L. HINDALL ET AL 2,656,399

METHOD AND APPARATUS FOR CURING
POSITIVE STORAGE BATTERY PLATES

Filed June 28, 1951

INVENTOR.
ALVA L. HINDALL
WILLIAM D. CARSON
BY

THEIR ATTORNEYS

Patented Oct. 20, 1953

2,656,399

UNITED STATES PATENT OFFICE 2,656,399

METHOD AND APPARATUS FOR CURING POSITIVE STORAGE BATTERY PLATES

Alva L. Hindall and William D. Carson, Muncie, Ind., assignors to General Motors Corporation, Detroit, Mich., a corporation of Delaware Application June 28, 1951, Serial No. 234,032

5 Claims. (Cl. 136—33)

This invention relates to storage batteries and particularly to a method and apparatus for accomplishing an accelerated curing of positive plates of the pasted type as used in storage batteries.

In Hindall Patent No. 2,481,218, a method for curing positive plates of the pasted type for use in storage batteries is disclosed. This method produces a highly satisfactory plate but requires a relatively long period of time and a relatively large apparatus to accomplish the curing process. This invention, utilizing the same starting product, produces plates in cured form having much the same physical and chemical characteristics as those produced by the aforementioned Hindall process but the plates are cured in a much shorter period of time with greater uniformity and with a smaller and more compact apparatus. In each instance, the cured plates may be subjected to an accelerated aging process as disclosed in Hindall Patent No. 2,553,192.

It is, therefore, the basic object of this invention to provide a method and apparatus for curing pasted positive plates for storage batteries wherein the product is uniform and the process is accomplished in a greatly reduced time period over prior art processes.

In carrying out the above object, it is a further object of the invention to control the cross sectional area of the curing oven around the plate to be cured to a critical point wherein the cross sectional area is in the order of one and one-half times the area of a plate to be cured whereby the volume around the plates is limited to produce the desired result. This is accomplished by preventing turbulence of the curing atmosphere around the plates whereby the plate is actually soaked in a humid atmosphere created solely by moisture driven from the paste.

A still further object of the invention is to cure the positive plates in a plurality of steps or zones within an oven wherein each successive step is preferably carried out at a relatively higher temperature and wherein the heat is supplied by gas burners producing combustion products rich in $CO_2$.

A still further object of the invention is to provide a method wherein the moisture content of the positive plate paste is reduced from about 13% initial moisture to about 8½ final moisture and wherein this reduction in moisture is accomplished without cracking of the plate paste due to the relatively high humidity maintained within the oven.

Further objects and advantages of the present invention will be apparent from the following description, reference being had to the accompanying drawings wherein preferred embodiments of the present invention are clearly shown.

Figure 1:
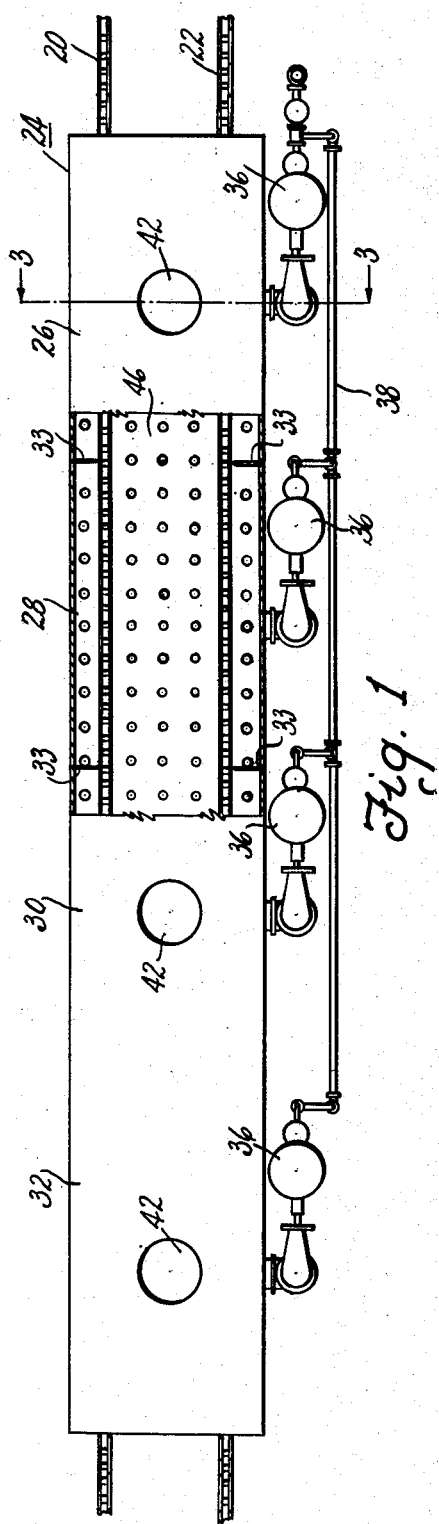
Fig. 1 is a top view of an oven with one section cut open.
Figure 2:
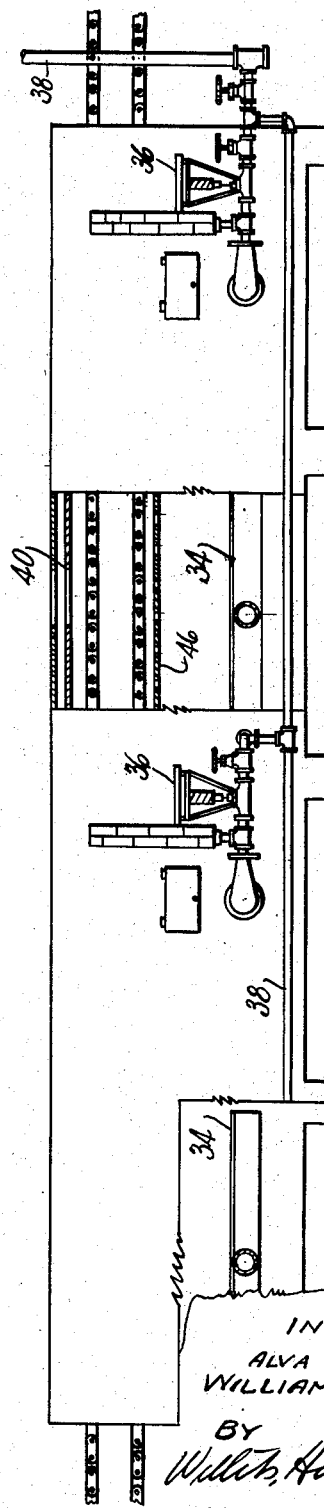
Fig. 2 is a side view of the oven shown in Fig. 1.

In the previously mentioned Hindall Patent No. 2,481,218, the curing of pasted positive plates is accomplished at temperatures in the order of 200° F. to 220° F. over a period of time ranging up to ¾ of an hour. During this cure, certain of the colloidal lead compounds are converted to basic lead sulphate and metallic lead in the plate paste is oxidized together with a predetermined reduction in the moisture content of the paste. Positive plate paste, when applied to the grids, is relatively high in water, for example, usually in the order of 13%. During the cure, it is desirable to reduce this moisture content to about 8½%. In the prior Hindall patent, a large oven was utilized approximately 80′ long which required up to ¾ of an hour for a plate to pass therethrough. The cross section of this oven was large and various zones were provided wherein the plate was partially dried and then heated in humid air which was induced therein.

We have found that by limiting the cross sectional area of the oven from a point substantially even with the bottom of the plate to the top of the oven to a ratio of between 1½ to 1 and 2 to 1, and by keeping the top edge of the plate as close as possible to the top of the oven, we can markedly increase the speed of curing, improve the uniformity of cure and in no way reduce the quality of the finished product. In fact, since greater uniformity is obtained, the quality of the product is actually improved. We have found that cures can be effected in as little time as six minutes by proper design of the oven wherein the plate is confined in a space so designed as to prevent turbulence of the products of combustion from the gas burners which are used to heat the oven.

We have further found that it is most desirable to bring the hot combustion gases into contact with the plates but to prevent strong convection currents through prevention of rapid passage of such gases, thereby eliminating, to a large degree, any turbulence or circulation of the combustion gases whereby the moisture dried out of the plates is held in close proximity to the surface thereof to effect a rapid cure. In fact, by using this particular oven design as noted herein, we effect the desired cure without adding any moisture to the oven other than that normally included in the plate paste and, of course, in the products of combustion. In other words, the humidity in the oven is provided by the moisture driven out of the plates.

In all past ovens of which we are aware, the cross sectional area is rather large and the desire has been to force the products of combustion between the plates quickly and rapidly to dry out the plates, thereby necessitating additional moisture in the later stages of the cure. By following the method described herein, the moisture as it is driven out of the plates remains in close proximity and contact with the surfaces thereof to effect the desired cure without the addition of moisture to the oven whereby a more rapid cure is obtained and the plates are found to be more uniform in their condition upon discharge from the oven.

Referring specifically to the drawings double section pasted grids 19 are received from a grid pasting machine, not shown, and are hung between a pair of chains 20 and 22 in an upright position and in spaced relation. The plates 19 pass immediately into the curing oven 24 and specifically into the first zone 26 thereof wherein the temperature of the incoming gases is maintained at about 290° F. The plate 19 then progresses into zone 2 as shown at 28 wherein the temperature is stepped up to 350° F., whereupon the plate is progressed through zones 30 and 32 wherein in each instance, a temperature of 400° F. is preferably provided. These temperatures, it will be understood, are for an eight minute travel through a 32' long oven and will obviously vary with the speed of travel and the length of oven. It will be understood in all cases that barriers are provided between each zone which comprise a plate 33 having an opening therethrough which is just large enough to pass the conveyor chains and the plate.

Describing the oven more specifically, zones 26, 28, 30 and 32 are actually four abutting sections, each 8' long, and each heated by an individual premix gas burner 34 which includes its own pressure regulator 36 and which is attached through suitable valving to a gas main 38. A false top is provided at 40 which extends the length of the oven and positioned so that a plate will just pass thereunder, and each zone or section is provided with a six inch diameter vent 42 with associated damper. The burners 34 are spaced about 10" below a perforated baffle 46 as noted in Fig. 3.

The temperature within each of the curing sections of the oven 24 is maintained by individual thermostats controlling each of the burners 34 and the draft or exhaust of each section is controlled by slide dampers, not shown, in the vents 42. It is understood that in place of individual zones, a gradual increase in temperature may be effected throughout the oven by other means, however, the zone method of control is by far the most facile construction.

The perforated baffle plate 46 is an important adjunct to the apparatus. It reduces turbulence and protects the plates, since it is not at all desirable to have a flame impinge directly thereon. At the temperatures involved, such impingement sometimes melts the edges of the plates and therefore, it is desirable to utilize the baffle which prevents direct impingement of the flame while simultaneously permitting the combustion gases to pass upwardly in contact with the plates, since carbon dioxide is very essential to the proper curing of the plates in the reduced time period.

As stated hereinbefore, the specific temperature of the incoming gases as used in several curing zones, is a matter of choice except for two limiting factors, namely, the temperature of the first zone must be above the boiling point of water while the temperature throughout the oven at the time of travel and specifically in the last zone must be below any temperature which will injure the plates. The speed at which the plate passes through the oven, also governs the temperature range to some extent and this speed is generally limited and controlled by the cooperating apparatus outside of the oven, such as the pasting machine and the break-apart machine which are preferably synchronized with the speed of the conveyor through the oven. Therefore, the example given hereinbefore, is in no way, limiting with respect to temperatures and speeds but is merely one example which yields satisfactory results wherein the conveyor is synchronized with existing pasting and break-apart apparatus.

We have found that very satisfactory plates can be cured in six minutes by utilizing incoming gas temperatures of 350° F., 420° F., 510° F. and 730° F. in the four zones. Another example of satisfactory temperatures utilizing a twelve minute cure are 240° F., 250° F., 300° F. and 300° F. In each case, during the curing process, the plates with around 13% moisture therein, enter the oven and some of the moisture is driven therefrom by the heat of the combustion gases. This forms a very humid atmosphere immediately adjacent the plate which quickly and effectively cures the plate paste. It will be noted that the highest humidity will be at the lower temperature end of the oven or at the start of the process since, as the plate progresses through the oven, increasingly less moisture is available, thereby effecting a gradual drying out of the plate paste. During the whole curing process, the plate is heated not only in a humid atmosphere but also in an atmosphere high in carbon dioxide. As the plate emerges from the oven, its moisture content is at least 8% and preferably about 8½%, which figure is highly satisfactory for immediate break-part. It is to be understood that the moisture content of the cured plate is maintained at about 8½% for practical reasons only since slightly higher or lower moisture, for example in the range of 7½% to 10½% is satisfactory from the curing standpoint, but when the moisture is much above 8½%, the plates must be dried before being broken apart and similarly, they tend to stick together when stacked. When the moisture is much below 8½%, the plates are very brittle and great care must be taken in the break-apart operation which is not desirable in commercial processes for large scale production.

Specifically, we have found that when drying out plates with 13% initial moisture that the relative humidity in the different zones approximates the following figures when the zones are heated to the example temperatures noted:

|  | Incoming gas Temperature, °F. | Relative Humidity, percent |
| --- | --- | --- |
| Zone #1 | 240 | 33 |
| Zone #2 | 250 | 30 |
| Zone #3 | 300 | 21 |
| Zone #4 | 300 | 19 |

During this curing period, the moisture content of the plates dropped from 13% to 8½%.

Another interesting observation concerns the drop in temperature of the curing gases after passing over the wet plates.

In this case, using the same temperatures noted above for the incoming gases, the temperatures dropped as follows after passing over the plates:

|  | Incoming gas Temperature, °F. | After Passing over Plates, °F. |
| --- | --- | --- |
| Zone #1 | 240 | 170 |
| Zone #2 | 250 | 200 |
| Zone #3 | 300 | 200 |
| Zone #4 | 300 | 204 |

From the foregoing, it will be noted that a preferred composite temperature range will include temperatures above 239° F. and below 731° F. with the time varying from 12 to 6 minutes. A broad temperature range, as mentioned before, is any temperature above 212° F. and below any temperature which will deleteriously affect the plate. In all cases, the temperatures are for the incoming gas and the curing should be carried out for a time sufficient to reduce the moisture content of the plates to about 8½%.

Figure 3:
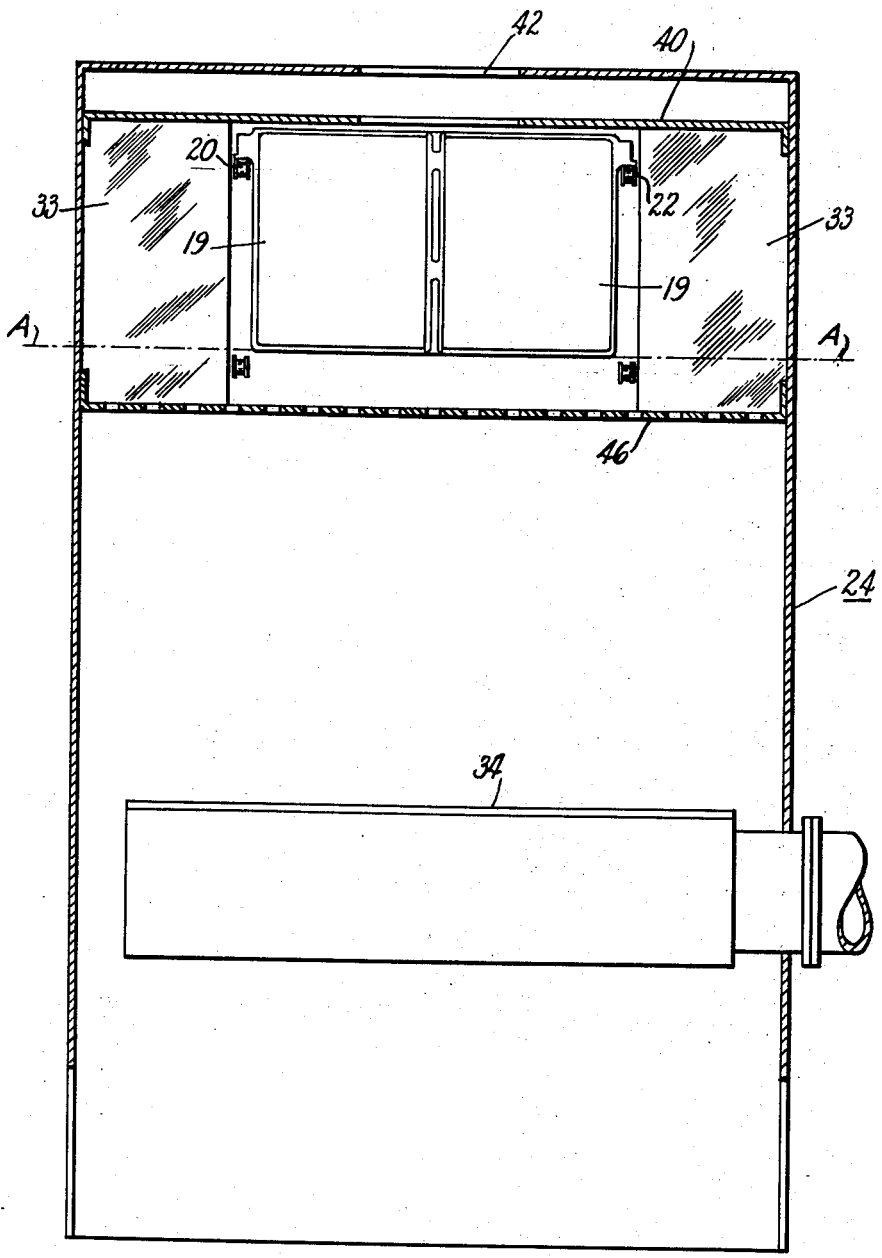
Fig. 3 is a sectional view taken on the line 3—3 of Fig. 1.

The entire success of this accelerated curing process may be attributed to the restricted cross sectional area of the oven wherein the ratio of from 1½ to 1 to 2 to 1 is maintained in that portion of the oven above at line A—A in Fig. 3 with respect to the area of the plate, in all cases, the plate being carried as close to the top of the oven as is commercially possible. By this method the plates are subjected to an elevated curing temperature in combustion gases which are free from any appreciable turbulence or circulation, thereby holding the gases in contact with the wet surfaces of the plate to form a moisture laden soaking atmosphere provided only by the moisture being driven off from the plate. We have found that when the ratio drops appreciably below 1½ to 1, too long a period is required to dry out the plates, while ratios appreciably above 2 to 1 permit too much circulation whereby a proper cure is difficult to obtain. Therefore in the claims to follow, it is understood that the limitation of about 1½ to 1 embraces a range of cross sections within the desirable operative range as explained herein.

While the embodiments of the present invention as herein disclosed, constitute preferred forms, it is to be understood that other forms might be adopted.

What is claimed is as follows:

1. In a method for curing a positive pasted plate of a lead storage battery while heating said plate in an oven at a temperature above 212° F. and below any temperature which will injure the plate, the steps of; soaking the plate in a humid atmosphere created solely by moisture driven from said plate paste, preventing any appreciable circulation of said atmosphere in the oven while maintaining the plate closely adjacent the top of the oven and confining the sides thereof so that the ratio of the area above the bottom plate to plate area is in the order of 1½ to 1 whereby the plate paste is cured and reduced in moisture content.

2. In a method for curing a positive pasted plate of a lead storage battery while heating said plate in an oven at a temperature above 212° F. and below any temperature which will injure the plate, that step of; confining the plate in the oven wherein the ratio of the cross sectional area of the oven, above the bottom of the plate, to plate area is in the order of 1½ to 1 for preventing any appreciable circulation of atmosphere in the oven whereby the plate is soaked in a humid atmosphere created solely by moisture driven therefrom.

3. In a continuous method for curing a positive pasted plate of a lead storage battery, the steps of: feeding a positive pasted plate to an oven at a uniform rate, progressing said plate in said oven, confining the oven volume so that the cross sectional area above the bottom of the plate to the plate area is in the order of 1½ to 1 wherein the plate is maintained closely adjacent the top of the oven whereby turbulence of atmosphere is maintained at a minimum, soaking the plate in a humid atmosphere created solely by moisture driven from said plate paste and progressively increasing the temperature within the oven from a temperature above 212° F. to a temperature below any temperature which will injure the plate and progressively reducing the moisture content of the plate from an initial moisture content of 13% to a moisture content in the order of 8½% and finally removing the plate from the oven in cured condition.

4. In a continuous method for curing positive pasted plates of a lead storage battery, the steps of: continuously supplying uncured positive pasted plates to an oven adjacent the top thereof, continuously progressing said plates through the oven, confining the oven volume around said plates so that the cross sectional area of said oven from the bottom of the plate to the top of the oven is in a ratio of about 1½ to 1 with respect to the area of a plate whereby turbulence of atmosphere is maintained at a minimum, heating the plates within said oven in at least three steps, each of which is at an increased temperature over the preceding step wherein the first step is at a temperature above 212° F. and wherein the last step is below any temperature which will injure the plate, simultaneously soaking said plates in a humid atmosphere created solely by the moisture driven from said plates within said oven, progressively decreasing the moisture content of said plates as they progress through the oven by controlled venting of the oven for relieving humidity therein and finally removing the plates from the oven when the moisture content has reached a figure of about 8½%.

5. In a continuous method of curing positive pasted plates of a lead storage battery while heating said plate in an oven, the steps of: continuously supplying uncured positive pasted plates to an oven, continuously progressing said plates through the oven, confining the oven volume around said plates so that the cross sectional area of said oven from the bottom of the plate to the top of the oven is in a ratio of about 1½ to 1 with respect to the area of the plate whereby turbulence of atmosphere is maintained at a minimum, heating the plates within the oven at a temperature in the order of 290° F. for about ¼ of the travel through the oven, raising the temperature to about 350° F. through another ¼ of the travel through the oven and finally increasing the temperature to 400° F. for the last half of the oven treatment, simultaneously soaking the plates wherein the initial moisture content is in the order of 13% in a humid atmosphere created solely by the moisture driven from said plates within said oven, progressively decreasing the moisture content of said plates as they progress through said oven and finally removing the plates from the oven when the moisture content has reached a figure of about 8½%.

ALVA L. HINDALL.
WILLIAM D. CARSON.

References Cited in the file of this patent

UNITED STATES PATENTS

| Number | Name | Date |
|---|---|---|
| 2,066,701 | Smith et al. | Jan. 5, 1937 |
| 2,149,812 | Lindstrom | Mar. 7, 1939 |
| 2,149,813 | Lindstrom | Mar. 7, 1939 |
| 2,481,218 | Hindall | Sept. 6, 1949 |
| 2,553,192 | Hindall | May 15, 1951 |

OTHER REFERENCES

Transactions of Electrochemical Society, vol. 69 (1936), pages 233–242.